United States Patent
Kono et al.

(10) Patent No.: US 6,516,235 B1
(45) Date of Patent: Feb. 4, 2003

(54) CONTROL APPARATUS AND METHOD OF CONTROL SYSTEM HAVING SLIDING RESISTANCE

(75) Inventors: Katsumi Kono, Toyota (JP); Toshinari Suzuki, Aichi-ken (JP); Yoshikazu Tanaka, Toyota (JP); Ryoichi Hibino, Aichi-ken (JP); Eiichi Ono, Aichi-ken (JP); Masataka Osawa, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/579,578

(22) Filed: May 26, 2000

(30) Foreign Application Priority Data

May 26, 1999 (JP) .......................................... 11-146793

(51) Int. Cl.$^7$ .............................................. G05B 13/02
(52) U.S. Cl. ......................................................... 700/40
(58) Field of Search ........................................... 700/40

(56) References Cited

U.S. PATENT DOCUMENTS

| | | | | |
|---|---|---|---|---|
| 4,713,596 A | * | 12/1987 | Bose ........................... | 318/802 |
| 5,285,379 A | * | 2/1994 | Gamble ........................ | 700/40 |
| 5,371,669 A | * | 12/1994 | Venkataraman et al. ...... | 700/40 |
| 5,384,525 A | * | 1/1995 | Kato ............................ | 318/610 |
| 6,185,467 B1 | * | 2/2001 | Romano et al. .............. | 700/28 |
| 6,367,449 B1 | * | 4/2002 | Moteki et al. ............... | 123/399 |
| 6,431,131 B1 | * | 8/2002 | Hosoya et al. ........... | 123/90.15 |

FOREIGN PATENT DOCUMENTS

| | | |
|---|---|---|
| JP | 2-75001 | 3/1990 |
| JP | 10-220499 A | 8/1998 |

OTHER PUBLICATIONS

Article, "Sliding Mode Control", Oct. 20, 1994.

* cited by examiner

Primary Examiner—Thomas Black
Assistant Examiner—Ronald D Hartman, Jr.
(74) Attorney, Agent, or Firm—Oblon, Spivak, McClelland, Maier & Neustadt, P.C.

(57) ABSTRACT

A control apparatus for controlling a control system having a sliding resistance by using a sliding mode control method determines a deviation of an actual value of a quantity of state that is to be caused to follow a target value from the target value (step 1), calculates a switching surface σ from the deviation (step 2), and determines a corrected switching surface σ' by adding a carrier wave to the calculated switching surface σ (step 3). The carrier wave is expressed by a periodic function, for example, a sine wave, a sawtooth pulse wave, or the like, and has finite gradients on its waveform. Then, the control apparatus outputs an amount of operation u based on the value of the corrected switching surface σ' (step 4). The amount of operation u behaves in a manner similar to that in an ordinary sliding mode control method when the switching surface σ is not close to zero. When the switching surface σ is close to zero, the amount of operation u periodically changes similarly to a dither signal. Therefore, the control apparatus is able to prevent deterioration of the controlling performance with respect to the sliding resistance and retain excellent robustness of the sliding mode control.

9 Claims, 8 Drawing Sheets

TIME t

TIME t

TIME t

CONTROL APPARATUS AND METHOD OF CONTROL SYSTEM HAVING SLIDING RESISTANCE

INCORPORATION BY REFERENCE

The disclosure of Japanese Patent Application No. HEI 11-146793 filed on May 26, 1999 including the specification, drawings and abstract is incorporated herein by reference in its entirety.

BACKGROUND OF THE INVENTION

1. Field of the Invention

The present invention relates to a control apparatus and a control method of a control system having a sliding resistance and, more particularly, to a control apparatus and a control method for controlling a control system having a sliding resistance by a sliding mode control method.

2. Description of the Related Art

As a technology related to the invention, there is a control apparatus that controls a hydraulic control system by using a sliding mode control method (proposed in, for example, Japanese Patent Application Laid-Open No. HET 8-61122, etc.). The sliding mode control method provides an excellent control system that has strong robustness. However, it is known that if unobservable parasitic dynamics or a long dead time exists in the control system of the sliding mode control method, the robustness of the control system remarkably decreases. To solve this problem, various methods are proposed, for example, a method in which the relationship between a switching surface σ and an amount of operation u, which is essentially discontinuous as indicated in FIG. 11, is substituted with a continuous saturation function as indicated in FIG. 12 (for example, NONAMI Kenzou, and TIAN Hongqi. *Sliding Mode Control*. Published by Corona Sha: p.27, etc.). In another proposed method, when the deviation of an actual value from a target value in the control system is relatively small, the switching of the control gain is changed from switching in software to switching in hardware to increase the switching speed (for example, Japanese Patent Application Laid-Open No. HEI 5-88749, etc.). In yet another proposed method the gain is reduced every time a switching surface crosses a switching surface (for example, Japanese Patent Application Laid-Open No. HEI 2-75001, etc.).

However, neither the method in which the relationship between the switching surface and the amount of operation is substituted with a saturation function, nor the method in which the gain is reduced every time the switching surface crosses the switching surface, causes the feedback control system to achieve convergence because when the control system is in a nearly converged state, that is, when the output of the switching surface is close to zero, the output gain approaches zero. This is because when the feedback control system is in the nearly converged state, switching between the static friction coefficient and the dynamic friction coefficient of the sliding surface occurs.

Thus, the presence of a sliding resistance in a control system gives rise to a problem of losing the effectiveness of the sliding mode control. For example, if a simulation is performed on the assumption that the sliding resistance is 1.2 times as great as the input value that is needed in order to shift the slip speed x1 of a clutch from 0 rpm to a target value of 20 rpm and that the dead time is 128 ms, the simulation provides results as indicated in FIGS. 13 to 16.

As indicated in FIG. 13, the presence of the sliding resistance prevents the slip speed x1 of the clutch from converging to the target value. FIG. 13 is a graph indicating time-dependent changes of the slip speed x1 of the clutch. FIG. 14 is a graph indicating time-dependent changes of the differential x2 of the slip speed x1. FIG. 15 is a graph indicating time-dependent changes of the amount of operation u. FIG. 16 is a graph indicating time-dependent changes of the switching surface σ.

SUMMARY OF THE INVENTION

Accordingly, it is an object of the invention to provide a control apparatus of a control system having a sliding resistance that is able to retain the robustness of the sliding mode control. It is another object of the invention to provide a control apparatus of a control system having a sliding resistance that is able to prevent deterioration of the controlling performance due to the presence of the resistance.

In order to achieve at least one of the aforementioned and other objects of the invention, the control apparatus of a control system having a sliding resistance of the invention has a construction as follows. A control apparatus according to one aspect of the invention controls a control system having a sliding resistance by a sliding mode control method. The control apparatus includes a switching surface computing device for computing a switching surface based on a quantity of state and a target value, a carrier wave adding device for adding a carrier wave having a waveform that has a gradient within a predetermined range to the switching surface computed by the switching surface computing device, and an operation amount setting device for setting an amount of operation based on a value of a switching surface obtained by adding the carrier wave to the switching surface computed by the switching surface computing device.

In the control apparatus of a control system having a sliding resistance according to the invention, the value of the switching surface changes periodically due to the carrier wave added to the switching surface, even when the feedback control system reaches a nearly converged state and, therefore, the value of output of the switching surface is in proximity of zero. Therefore, even through the control system has a sliding resistance, the control apparatus is able to control the control system in a good manner. Furthermore, since the amount of operation is changed in accordance with the value of the switching surface for the control, high robustness can be maintained.

A control method according to another aspect of the invention computes a switching surface based on a quantity of state and a target value, adds a carrier wave having a waveform that has a gradient within a predetermined range to the switching surface computed, and sets an amount of operation based on a value of a switching surface obtained by adding the carrier wave to the computed switching surface.

The "waveform that has a gradient within a predetermined range" does not include a waveform that has an infinite gradient at a vertically changing portion of the waveform, for example, a rectangular waveform such as a dither waveform or the like, but includes various waveforms that can be expressed by periodic functions, for example, sine waveforms having finite gradients, composite waveforms of a plurality of sine waveforms, sawtooth pulse waveforms, trapezoidal waveforms, and the like. Furthermore, since the "waveform that has a gradient within a predetermined range" is the waveform of the carrier wave, the "waveform" is limited to waveforms that periodically change.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

Figure 1:
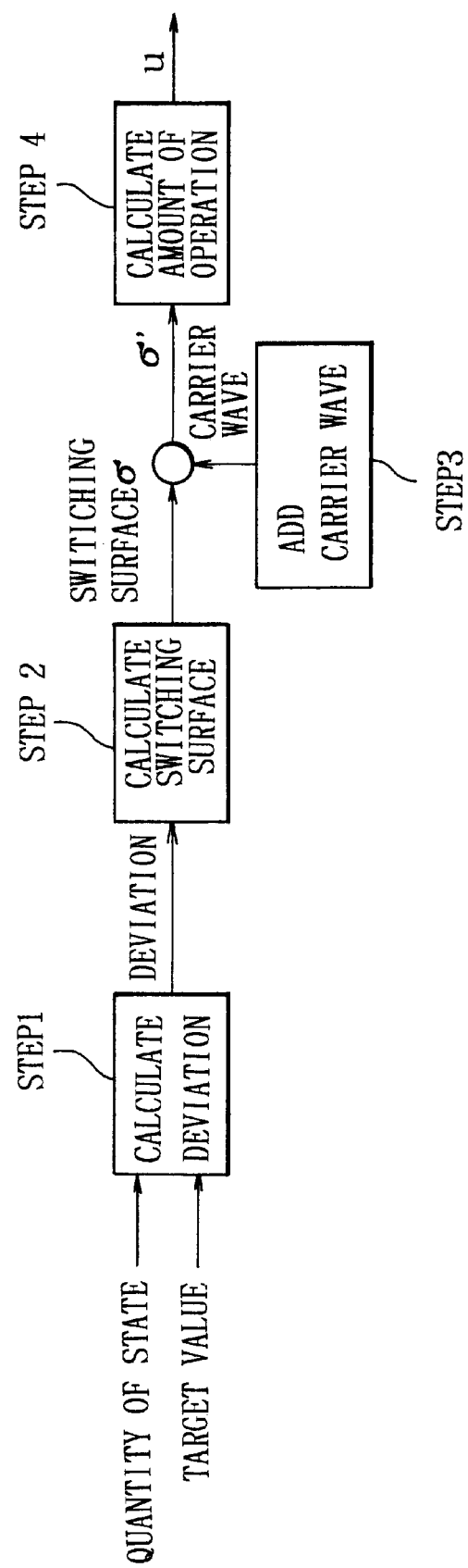
FIG. 1 is a block diagram illustrating the concept of a control apparatus of a control system having a sliding resistance according to a preferred embodiment of the invention.

A preferred embodiment of the invention will be described hereinafter with reference to the accompanying drawings. FIG. 1 is a block diagram illustrating the concept of a control apparatus and a control method of a control system having a sliding resistance according to the preferred embodiment of the invention. The control apparatus of the embodiment performs the sliding control of the control system having a sliding resistance. The control apparatus can take any form. For example, it can take the form of a programmed general purpose computer having a CPU, a ROM, a RAM, A/D interfaces, etc. It can also take the form of discrete hard wired circuits.

As illustrated in FIG. 1, the control apparatus of the embodiment determines a deviation of an actual value of a quantity of state that is to be caused to follow a target value from the target value in step 1. If the control system is constructed by a servo system, the control system determines a deviation of an actual value of a quantity of state that is to be caused to follow a target value based upon a time integral of a deviation of the actual value from the target value in step 1, instead of determining the deviation of the actual value from the target value.

Figure 2:
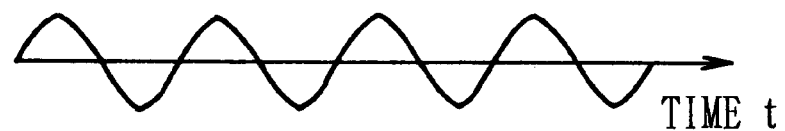
FIG. 2 is a graph indicating the waveform of a sine wave as an example of a carrier wave that can be employed in the embodiment.
Figure 3:
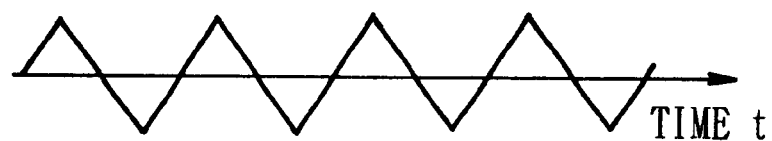
FIG. 3 is a graph indicating the waveform of a sawtooth pulse wave as another example of the carrier wave that can be employed in the embodiment.
Figure 4:
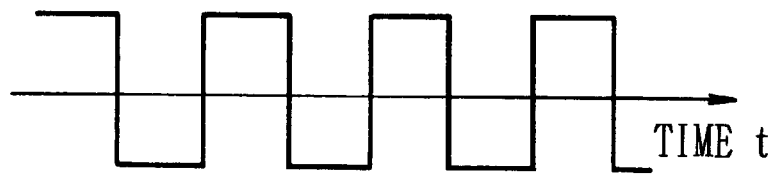
FIG. 4 is a graph indicating the waveform of a dither wave (rectangular wave) as an example of the carrier wave that cannot be employed in the embodiment.

Subsequently in step 2, switching surface computing means of the control system calculates a switching surface σ from the deviation determined in step 1. In step 3, carrier wave adding means of the control apparatus adds a carrier wave to the switching surface σ calculated in step 2. The carrier wave needs to be expressed by a periodic function, for example, a sine wave as indicated in FIG. 2, a sawtooth pulse wave as indicated in FIG. 3, or the like, and needs to have finite gradients on the waveform. That is, the aforementioned carrier wave does not include dither waves (rectangular waves) as indicated in FIG. 4, in which all the gradients on the waveform are a positive infinite, a negative infinite, and zero. The reasons for excluding the dither waves and the like will be stated below. Hereinafter in this specification, the switching surface obtained by adding a carrier wave is referred to as a "corrected switching surface σ'.

Subsequently in step 4, operation amount setting means of the the control apparatus outputs an amount of operation u based on a value of the corrected switching surface σ', that is, the switching surface obtained by adding the carrier wave.

Figure 5A:
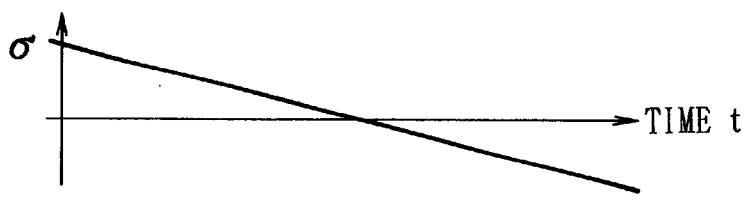
FIGS. 5a to 5d are diagrams indicating the relationship among a switching surface σ, a corrected switching surface σ' and an amount of operation u in the control method of the embodiment in a case where a sawtooth pulse wave is employed as a carrier wave.
Figure 5B:
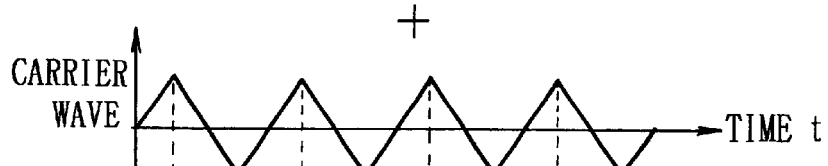
Figure 5C:
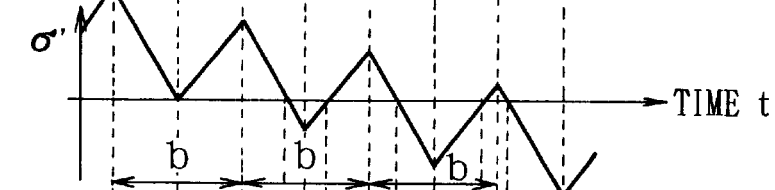
Figure 5D:
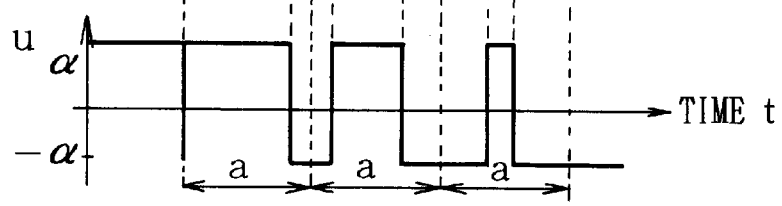

FIGS. 5a, 5c and 5d indicate an example of the relationship among the switching surface σ, the corrected switching surface σ', and the amount of operation u in a control apparatus of the embodiment that employs, as a carrier wave, a sawtooth pulse wave as indicated in FIG. 5b. As can be seen from FIGS. 5a to 5d, since the sawtooth pulse wave is added to the switching surface σ the corrected switching surface σ alternately becomes positive and negative in proximity of zero, where the switching surface σ changes from the positive side to the negative side. Therefore, the amount of operation u alternately becomes a plus α and a minus α corresponding to the positiveness and negativeness of the corrected switching surface σ'. Since the time ratio between the plus α and the minus α of the amount of operation u corresponds to the value of the switching surface σ, the switching surface σ becomes stable in a state in which the switching surface σ reaches zero.

This has the following effect. When the control is in a steady state, that is, when the switching surface σ is in proximity of zero, the value of the amount of operation u, that is, a feedback output, regularly alternates between the plus α and the minus α at the frequency of the carrier wave (the period is indicated by a or b in FIGS. 5c and 5d) even when an external disturbance occurs, so that high robustness is maintained. That is, the value of the amount of operation u exhibits movements substantially the same as those in an ordinary sliding mode control method when the switching surface σ is not at zero. When the switching surface σ is close to zero, the value of the amount of operation u exhibits periodical movements substantially the same as those of a dither signal. That is, the width of the plus α signal becomes progressively smaller, and the width of the minus α signal becomes progressively larger, as the value of the switching surface σ approaches zero, and their widths become equal when the value of the switching surface σ equals zero. Furthermore, the amount of actuation of a control object can be changed in accordance with the magnitude of the switching surface σ. As a result, deterioration of the controlling performance with respect to the sliding resistance can be prevented, and excellent robustness of the sliding mode control can be maintained.

Figure 6A:
FIGS. 6a to 6d are diagrams indicating the relationship among a switching surface σ, a corrected switching surface σ' and an amount of operation u in a control apparatus of a comparative example in a case where a dither wave (rectangular wave) is employed as a carrier wave.
Figure 6B:
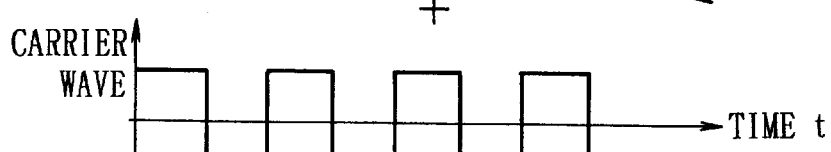
Figure 6C:
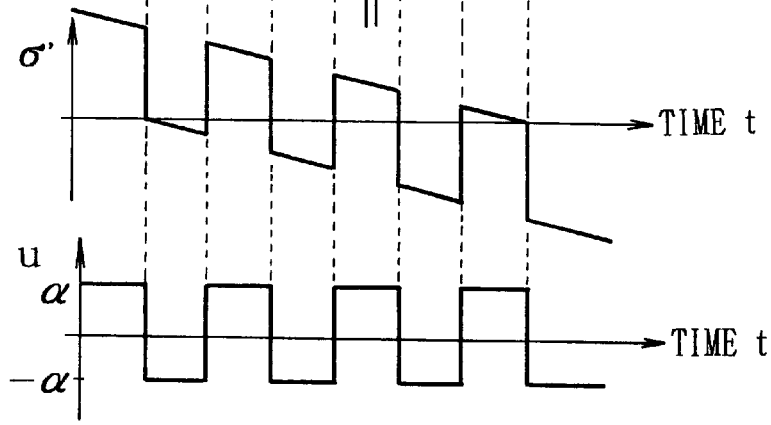
Figure 6D:
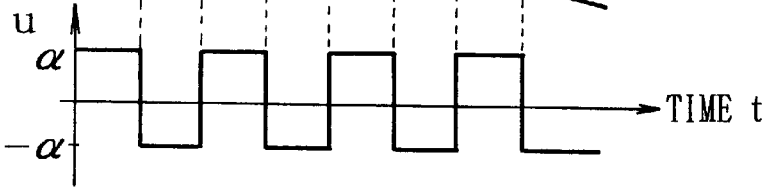

FIGS. 6a, 6c and 6d indicate an example of the relationship among the switching surface σ, the corrected switching surface σ' and the amount of operation u in a control apparatus according to a comparative example that employs, as a carrier wave, a dither wave (rectangular wave) as indicated in FIG. 6b. As indicated in FIG. 6d, the amount of operation u assumes the same waveform as that of the carrier wave (dither wave); i.e., the widths of the plus and minus α signals are always the same. Thus, unlike the case of FIGS. 5a to 5d, where the sawtooth pulse wave is employed as a carrier wave, the value of the switching surface σ is not reflected in the value of α the case of FIGS. 6a to 6d.

For the reasons stated above, the dither waves are inappropriate as a carrier wave that is employed in the control apparatus of the embodiment.

Next described will be a case where the control apparatus of the embodiment of a control system having a sliding resistance is applied to a clutch control system. Equation (1) expresses a control object as a linear-quadratic system. In equation (1), x1 is the slip speed (rpm) of a clutch, x2 is the time differential (rpm/s) of the slip speed x1, u is the amount of operation, that is, the controller output (%), and a1, a2, b are state variables.

$$\begin{bmatrix} \dot{x}1 \\ \dot{x}2 \end{bmatrix} = \begin{bmatrix} 0 & 1 \\ -a1 & -a2 \end{bmatrix} \begin{bmatrix} x1 \\ x2 \end{bmatrix} + \begin{bmatrix} 0 \\ b \end{bmatrix} u \qquad (1)$$

Based on equation (1), equation (2) can be obtained, considering the approach of an actual value to a target value and the application to a servo system. In equation (2), r is a target value of the slip speed x1, and v is a time integral of the difference between the slip speed x1 and the target value r.

$$\begin{bmatrix} \dot{x}1 \\ \dot{x}2 \\ \dot{v} \end{bmatrix} = \begin{bmatrix} 0 & 1 & 0 \\ -a1 & -a2 & 0 \\ -1 & 0 & 0 \end{bmatrix} \begin{bmatrix} x1 \\ x2 \\ v \end{bmatrix} + \begin{bmatrix} 0 \\ b \\ 0 \end{bmatrix} u + \begin{bmatrix} 0 \\ 0 \\ 1 \end{bmatrix} r \qquad (2)$$

After the quantities of state in equation (2) are subjected to low-pass filters expressed by equations (3) to (5), a switching surface σ can be calculated as in equation (6). In equations (3) to (5), F, G, H, L are coefficients. In equation (6), S1, S2 are coefficients in the sliding mode control method. The parenthetical expression in equation (6) corresponds to the calculation of the deviation in step 1 in FIG. 1. The entire mathematical expression in equation (6) cor-responds to the calculation of the switching surface σ in step 2 in FIG. 1.

$$\begin{cases} \dot{x}1 = F \times w1 + G \times x1 \\ x1' = H \times w1 + L \times x1 \end{cases} \qquad (3)$$

$$\begin{cases} \dot{w}2 = F \times w2 + G \times x2 \\ x2' = H \times w2 + L \times x2 \end{cases} \qquad (4)$$

$$\begin{cases} \dot{w}3 = F \times w3 + G \times v \\ v' = H \times w3 + L \times v \end{cases} \qquad (5)$$

$$\sigma = S1 \times (x1' - k \times v') + S2 \times x2' \qquad (6)$$

Then, a corrected switching surface σ' is calculated by adding a carrier wave f(ω, t) to the switching surface σ as in equation (7). Based on the value of the corrected switching surface σ', an amount of operation u, that is, a feedback output, is calculated as in equation (8). The calculation of a corrected switching surface σ' in equation (7) corresponds to step 3 in FIG. 1. The calculation of the amount of operation u based on the value of the corrected switching surface σ' in equation (8) corresponds to step 4 in FIG. 1.

$$\sigma' = \sigma + f(\omega, t) \qquad (7)$$

$$u = U\_nl \qquad (8)$$

$$U\_nl = \begin{cases} -\alpha & \text{when: } \sigma' \geq 0 \\ +\alpha & \text{when: } \sigma' < 0 \end{cases} \quad (\alpha \text{ is a positive number})$$

Figure 7:
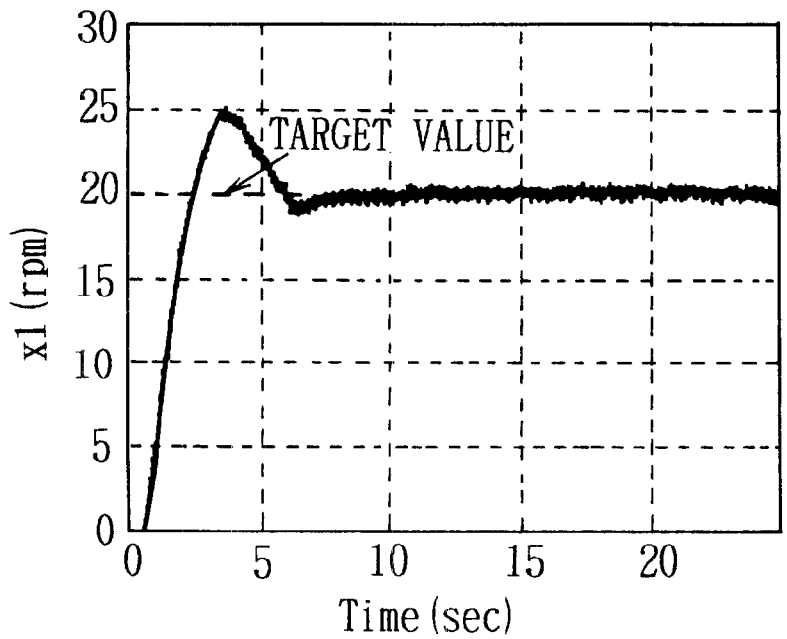
FIG. 7 is a graph indicating time-dependent changes of the slip speed x1 of a clutch as a result of a simulation.
Figure 8:
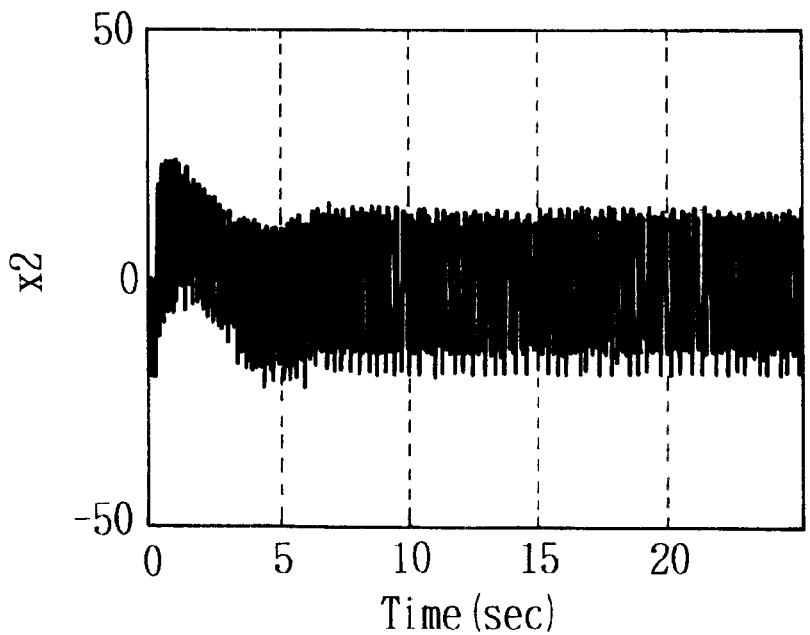
FIG. 8 is a graph indicating time-dependent changes of the differential x2 of the slip speed x1 as a result of the simulation.
Figure 9:
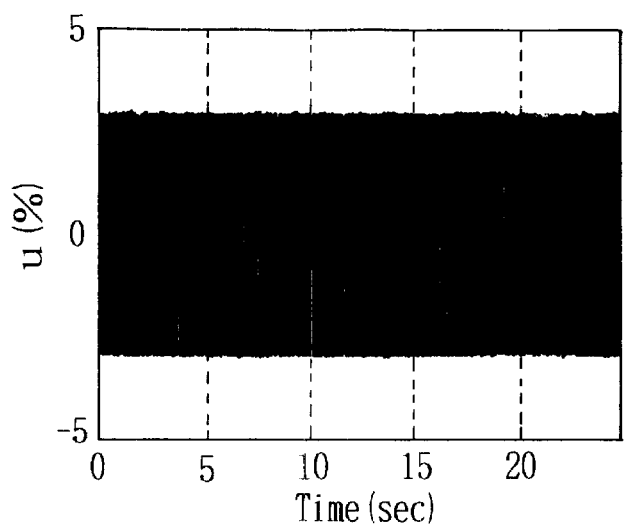
FIG. 9 is a graph indicating time-dependent changes of the amount of operation u as a result of the simulation.
Figure 10:
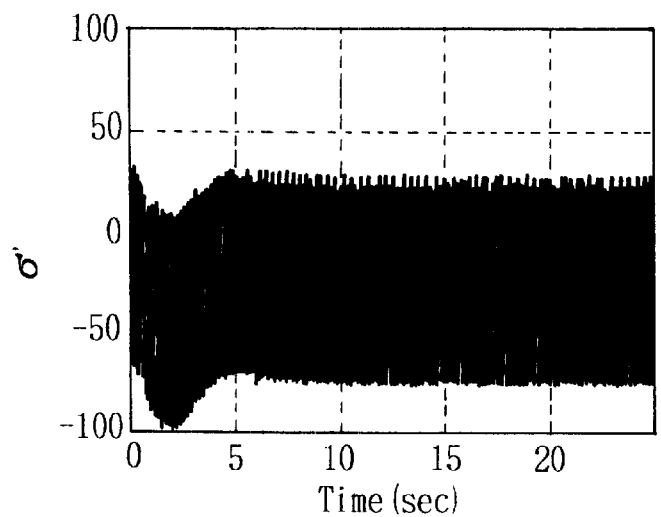
FIG. 10 is a graph indicating time-dependent changes of the corrected switching surface σ' as a result of the simulation.
Figure 11:
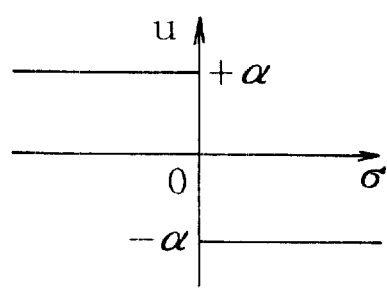
FIG. 11 is a graph indicating the relationship between the switching surface σ and the amount of operation u in the sliding mode control method.
Figure 12:
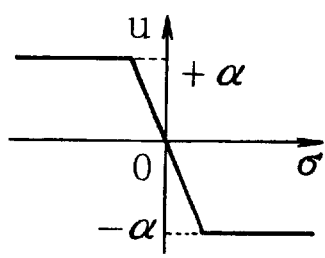
FIG. 12 is a graph indicating the relationship between the switching surface σ and the amount of operation u, where the relation therebetween in the sliding mode control method is replaced with a saturation function.
Figure 13:
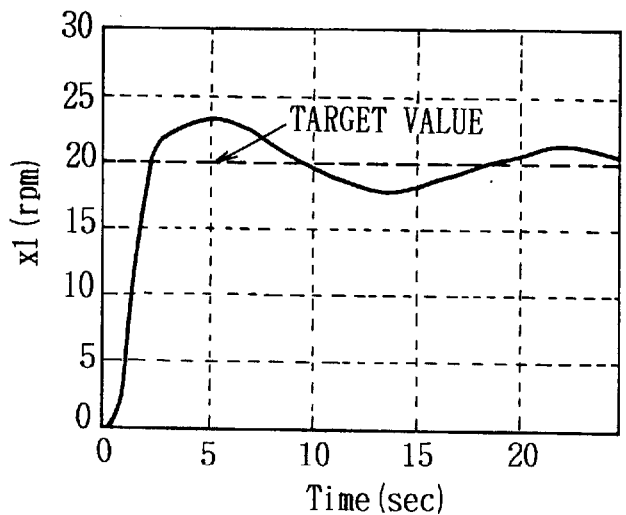
FIG. 13 is a graph indicating time-dependent changes of the slip speed x1 of a clutch as a result of a simulation in which an amount of operation u and a switching surface σ according to the conventional art are used.
Figure 14:
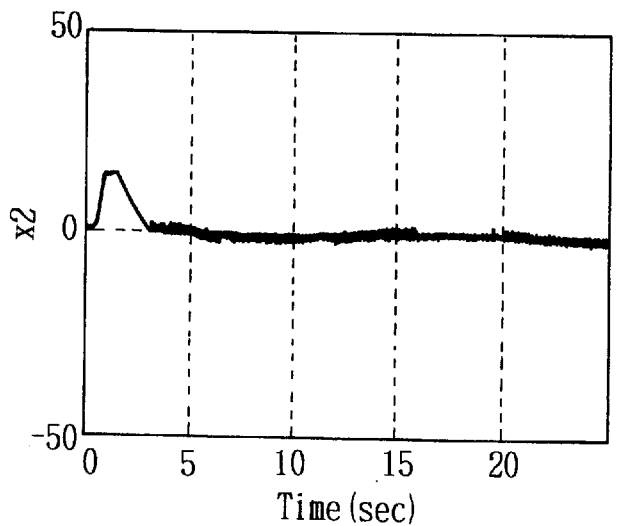
FIG. 14 is a graph indicating time-dependent changes of the differential x2 of the slip speed x1 as a result of the simulation in which the amount of operation u and the switching surface σ according to the conventional art are used.
Figure 15:
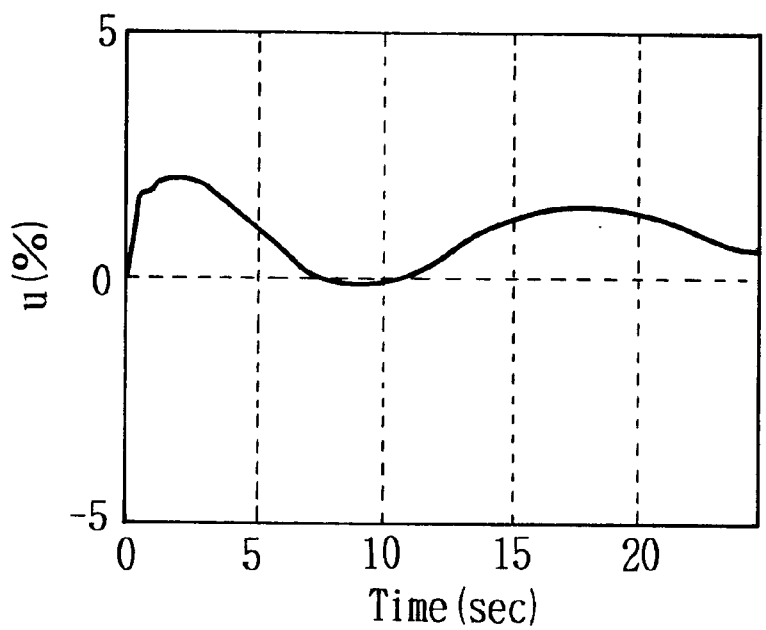
FIG. 15 is a graph indicating time-dependent changes of the amount of operation u as a result of the simulation in which the amount of operation u and the switching surface σ according to the conventional art are used.
Figure 16:
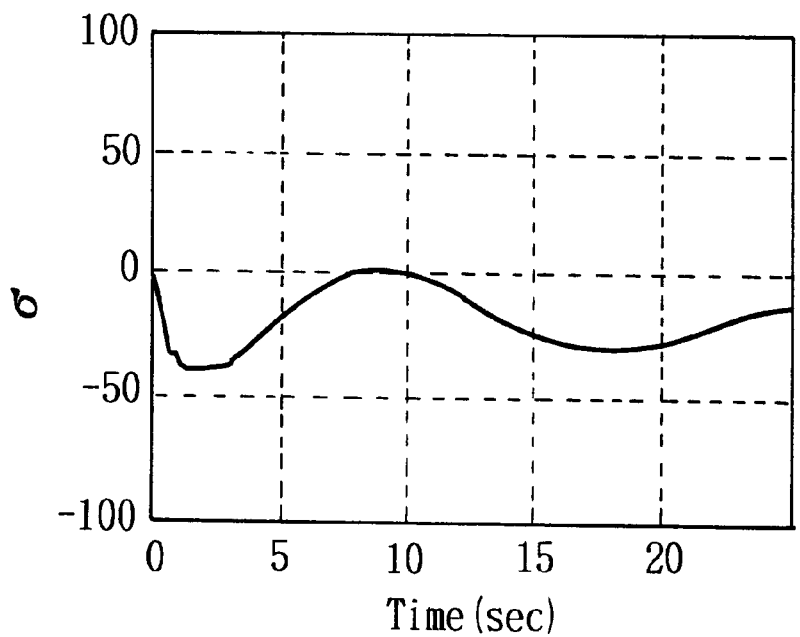
FIG. 16 is a graph indicating time-dependent changes of the switching surface σ as a result of the simulation in which the amount of operation u and the switching surface σ according to the conventional art are used.

FIGS. 7 to 10 indicate results of a simulation where the carrier wave f(ω, t) was a sine wave having an amplitude of 120 and a period of 0.168 second (5.95 Hz) and a target value r of 20 rpm was given when the slip speed x1 is 0 rpm. FIG. 7 is a graph indicating time-dependent changes of the slip speed x1 of the clutch. FIG. 8 is a graph indicating time-dependent changes of the differential x2 of the slip speed x1. FIG. 9 is a graph indicating time-dependent changes of the amount of operation u. FIG. 10 is a graph indicating time-dependent changes of the corrected switching surface σ'. As indicated in FIG. 7, the slip speed x1 of the clutch converged to the target value r of 20 rpm in the case of the control apparatus according to the embodiment, unlike the case of the conventional control apparatus indicated in FIGS. 13 to 16.

As is apparent from the above description, the control apparatus of a control system having a sliding resistance according to the embodiment determines a corrected switching surface σ' by adding a carrier wave having finite gradients on its waveform to a switching surface σ of the sliding mode control method, and outputting an amount of operation u based on the value of the corrected switching surface σ'. Therefore, the control apparatus of the embodiment is able to improve the controlling performance with respect to a control system having a sliding resistance and a dead time, and is also able to retain high robustness.

Although the control apparatus of the embodiment is described above by using the equations in conjunction with a clutch control system that has a servo-system construction, the control system does not need to have a servo-system construction. In the case of a control system that does not have a servo-system construction, equation (6) may be replaced with equation (9).

$$\sigma = S1 \times (x1' - r) + S2 \times x2' \qquad (9)$$

Although in the control apparatus of the embodiment, the amount of operation u is outputted by using equation (8), the amount of operation u may also be outputted by using equation (10) instead.

$$u = \phi 1 \times (x1' - k \times v') + \phi 2 \times x2' + Unl \tag{10}$$

$$\phi 1 = \begin{cases} -\alpha 1 & \text{when: } \sigma' \times (x1' - k \times v') \geq 0 \\ +\alpha 1 & \text{when: } \sigma' \times (x1' - k \times v') < 0 \end{cases} \quad (\alpha 1 \text{ is a positive value})$$

$$\phi 2 = \begin{cases} -\alpha 2 & \text{when: } \sigma' \times 2 \geq 0 \\ +\alpha 2 & \text{when: } \sigma' \times x2' < 0 \end{cases} \quad (\alpha 2 \text{ is a positive value})$$

$$Unl = \begin{cases} -\alpha 3 & \text{when: } \sigma' \geq 0 \\ +\alpha 3 & \text{when: } \sigma < 0 \end{cases} \quad (\alpha 3 \text{ is a positive value})$$

Although the control apparatus of the embodiment is described with reference to the case where the control apparatus is applied to a clutch control system, the control apparatus of the embodiment may also be applied to other control systems having a sliding resistance and a dead time.

Furthermore, the control apparatus of the embodiment of the invention has a construction in which a carrier wave having a periodic waveform is added to a switching surface of a control object so that the sliding surface is always slid. In this construction, therefore, the switching between a dynamic friction coefficient and a static friction coefficient does not occur on the sliding surface. Hence, the non-linear characteristic of the friction coefficient of the sliding surface can be cancelled out, so that the effectiveness of the sliding mode control is maintained and the converging characteristic of the control system improves.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A control apparatus for controlling a control system having a sliding resistance by a sliding mode control method, comprising:

switching surface computing means for computing a switching surface based on a quantity of state and a target value;

carrier wave adding means for adding a carrier wave to the switching surface computed by the switching surface computing means, the carrier wave having a waveform that periodically changes; and operation amount setting means for setting an amount of operation based on a value of a switching surface obtained by adding the carrier wave to the switching surface computed by the switching surface computing means.

2. A control apparatus according to claim 1, wherein the switching surface computing means computes the switching surface based on a deviation between the quantity of state and the target value.

3. A control apparatus according to claim 1, wherein the switching surface computing means computes the switching surface based on a deviation of an actual value of the quantity of state that is to follow the target value and a time integral of a deviation of the actual value and the target value.

4. A control apparatus according to claim 1, wherein in the control system having the sliding resistance, the carrier wave adding means comprises sliding means for sliding a sliding surface continuously and periodically by using the waveform that has a gradient within a predetermined range and that periodically changes.

5. A control apparatus according to claim 1, wherein the carrier wave is a sine wave.

6. A control apparatus according to claim 1, wherein the carrier wave is a composite wave of a plurality of sine waves.

7. A control apparatus according to claim 1, wherein the carrier wave is a sawtooth wave.

8. A control apparatus according to claim 1, wherein the carrier wave is a trapezoidal wave.

9. A control method for controlling a control system having a sliding resistance by a sliding mode control method, comprising:

computing a switching surface based on a quantity of state and a target value;

adding a carrier wave to the computed switching surface, the carrier wave having a waveform that periodically changes; and setting an amount of operation based on a value of a switching surface obtained by adding the carrier wave to the computed switching surface.

* * * * *